United States Patent [19]

Kaplan

[11] 4,245,896
[45] Jan. 20, 1981

[54] SPECTACLES

[76] Inventor: Michael A. Kaplan, 2659 Karen St., Bellmore, N.Y. 11710

[21] Appl. No.: 954,223

[22] Filed: Oct. 24, 1978

[51] Int. Cl.² ............................................. G02C 5/00
[52] U.S. Cl. ...................................... 351/41; 351/52; 351/158
[58] Field of Search ...................... 351/41, 149, 42–46, 351/53–55, 111, 57, 50, 52, 57, 141, 123, 128, 158, 159; 63/1, 2; 2/14–15; 91/51, 1

[56] References Cited

U.S. PATENT DOCUMENTS

| | | | |
|---|---|---|---|
| 2,230,185 | 1/1941 | Hyde | 351/159 |
| 3,168,741 | 2/1965 | Belgard | 351/41 |
| 3,555,563 | 1/1971 | Grossman | 351/46 |
| 4,105,305 | 8/1978 | Lazarus | 351/111 |

OTHER PUBLICATIONS

Shuron Optical Co., Geneva, N.Y. Mar. 16, 1936, Bulletin M-17 and Feb. 1938 bulletin No. M-28.

Primary Examiner—John K. Corbin
Assistant Examiner—B. Wm. de los Reyes
Attorney, Agent, or Firm—Bertram Frank

[57] ABSTRACT

An eyeglass element of spectacles, to which a component, such as a nose piece or a temple piece of the spectacles or an ornamental piece, is to be affixed, includes a through hole having an enlarged end portion in which an actuating portion of a connecting member which is threadedly connected to the component is received when the connecting member assumes its tightened position. The connecting member may be configured as a nut having a transverse slot extending across a threaded bore of the nut, and then a screwdriver having a bifurcated end portion may be used for tightening the nut and subsequently the portion of the stem onto which the nut is threaded which extends beyond the nut may be severed from the remainder of the stem. The component being affixed to the eyeglass element may be prevented from rotating during the tightening of the connecting member by being provided with a projection which is received in a non-circular recess in the eyeglass element which extends transversely from the through hole at the end which is remote from the enlarged end.

11 Claims, 11 Drawing Figures

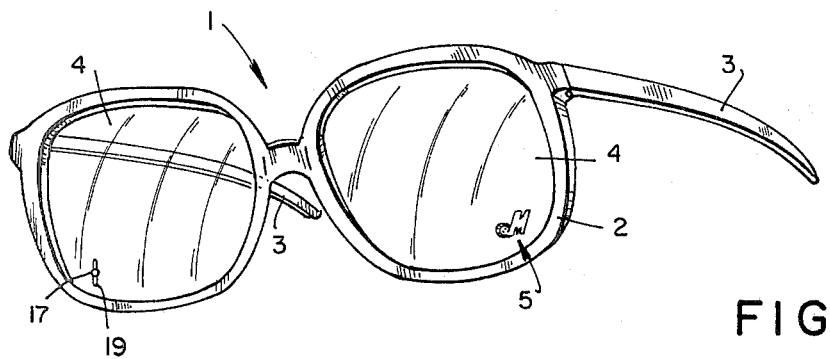
FIG. 1
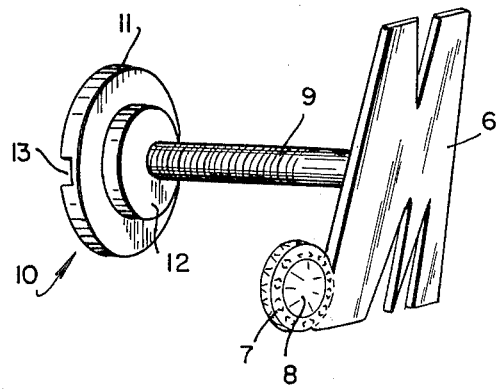
FIG. 2
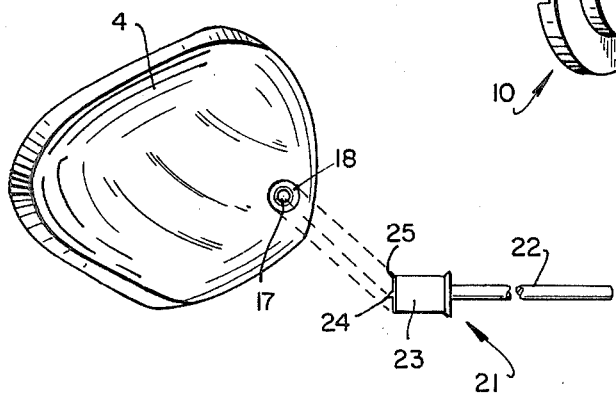
FIG. 3
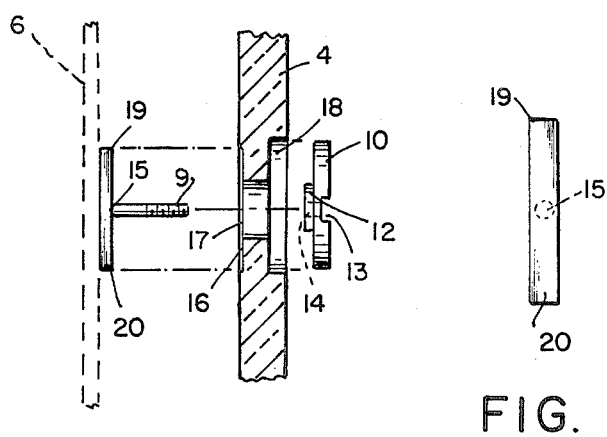
FIG. 4
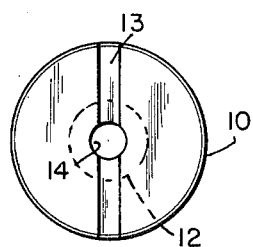
FIG. 5
FIG. 6

SPECTACLES

BACKGROUND OF THE INVENTION

The present invention relates to spectacles in general, and more particularly to prescription eyeglasses or sunglasses to which various components are connected by threaded connecting members.

There are already known various constructions of spectacles in which certain components, such as the nose piece or the temple pieces, more particularly the hinge components of the latter, are affixed to the eyeglass element to constitute the spectacles therewith. In many instances, screws, nuts or similar threaded members are being used for affixing the components to the eyeglass elements. When this approach to the affixation of the components to the eyeglass elements is resorted to, the part of the connecting element which is located at the inside of the eyeglass element as considered in the position of use of the spectacles extends a certain distance beyond the surface of the eyeglass element which faces the eyes of the user when in use, thus presenting the danger that, in the event that the spectacles are subjected to impact or pressure forces directed toward the face of the user, this projecting portion of the connecting element may cause damage either to the skin or even to the eye of the user. This, of course, is very disadvantageous and hazardous.

It is also known to provide frames of prescription eyeglasses or sunglasses with various ornamental features which may extend into juxtaposition with the eyeglass elements and partially cover the same. However, the possibilities of resorting to this approach are very limited indeed and, in any event, because of the fact that structural strength is a very important factor in designing these ornamental extensions of the frame, they tend to be quite bulky which substantially detracts from their aesthetic appeal.

SUMMARY OF THE INVENTION

Accordingly, it is a general object of the present invention to avoid the above-discussed disadvantages of the prior art.

More particularly, it is an object of the present invention to provide spectacles which are very safe to use but which have a very high aesthetic appeal nevertheless.

A further object of the present invention is to render it possible to locate an ornamental piece safely at any location of the eyeglass element.

A concomitant object of the present invention is to develop an arrangement for manufacturing the eyeglasses of the above-discussed type.

Finally, it is an object of the present invention to present a method of manufacturing the above-mentioned spectacles which can be very easily accomplished while obtaining reliable results.

In pursuance of these objects and others which will become apparent hereafter, one feature of the present invention resides, briefly stated, in spectacles comprising, in combination, at least one eyeglass element; at least one discrete component; and means for affixing the component to the eyeglass element, which includes means bounding a through hole having a cross-sectionally enlarged end portion in the eyeglass element, a connecting member, a first thread section on the component and a compatible second thread section on the connecting member, one of the thread sections being received in the hole and threadedly engaging the other thread section, and an actuating section on the connecting member which is operative for turning the connecting member upon actuation and which has a cross-sectional diameter at most equal to that of the end portion of the hole to be at least partially received in the latter upon tightening of the connecting member. In this connection, it is particularly advantageous when the end portion of the through hole in the eyeglass element has such a depth that the actuating section of the connecting member is fully accommodated therein upon tightening. Owing to the partial or full accommodation of the actuating section of the connecting member in the enlarged end portion of the through hole, the connecting member will extend beyond the internal surface of the eyeglass element only to a minimum extent, if at all, so that the danger of injury caused by this connecting element is minimized if not entirely eliminated.

A particularly advantageous and currently preferred embodiment of the present invention is obtained when the component has an externally threaded stem rigid therewith, which constitutes the above-mentioned one thread section, and when the connecting member is a nut which has an internal thread constituting the other thread section and threaded onto the externally threaded stem. Then, it is also advantageous when the nut has a central bore therein which has the internal thread over substantialally the entire length thereof and which is open at both of its ends. Under these circumstances it is proposed by the present invention that the actuating section of the nut have a transverse slot at one end thereof, which slot extends across one of the ends of the bore and has two slot sections each of which is located to one side of this end of the bore, each of the slot sections being adapted for receiving one leg of a bifurcated end portion of a screw driver. When this expedient is resorted to, the nut can be tightened by the screwdriver despite the fact that a free end portion of the stem may extend beyond the end face of the nut at least during the final stages of tightening of the nut, without interference with or by this free end portion.

A particular aspect of the present invention which is especially useful when the eyeglass element is relatively thin but which can also be advantageously used with a thick eyeglass element, such as a lens of prescription eyeglasses, resides in the fact that the bounding means is so configurated as to form an abutment shoulder between the end portion and the remainder of the hole. Then, the actuating section of the connecting member advantageously has a contact surface which contacts the abutment shoulder on tightening of the connecting member.

The above-mentioned component can either be a nose piece of the spectacles, a hinge component of a temple piece of the spectacles or an ornamental piece visibly arranged on the eyeglass element. An expedient of the present invention which is particularly useful in connection with the ornamental piece resides in the fact that there may be provided means for blocking the component in position during the tightening of the connecting member, this blocking means advantageously including means defining a non-circular recess in the eyeglass element at the end portion of the hole which is remote from the endlarged end portion, this recess extending transversely from this other end portion of the hole, the component then having a projection which is substantially fittingly received in the recess. Inasmuch as the recess is non-circular, which means that it does not have a shape of a circle centered on the axis of the through hole in the eyeglass element, the projection of the component, and thus the entire component, will be prevented from rotating about the axis of the stem which passes through the hole of the eyeglass element, while the connecting member is being tightened.

A further aspect of the present invention resides in an arrangement for manufacturing spectacles of the type having eyeglass elements and discrete components affixed to the eyeglass elements, which arrangement comprises means for forming in the respective eyeglass element a through hole having an enlarged end portion having such dimensions as to at least partially receive an actuating section of a connecting member affixing the respective component to an eyeglass element; and means for so actuating the actuating section of the connecting member as to turn the latter in a thread engagement with a thread section of the component to and from a tightened position in which the actuating section is at least partially received in the enlarged end portion of the hole. Advantageously, the above mentioned forming means includes means for enlarging the end portion of the through hole, especially a drilling tool having a substantially spherical drilling portion or a drilling tool having an axis and a cutting edge extending substantially normal to and across the axis.

In this connection, it is particularly advantageous when the connecting member is a nut having an internal thread and when the thread section is a stem rigid with the component and having an external thread. Then, the actuating means advantageously includes a screwdriver engaging a transverse slot in the actuating section of the nut. In this context, it is further advantageous when the nut has a central bore having the internal thread and opening onto an end face of the actuating section which has the slot therein, the slot thus having two slot sections each to one side of the bore. When the nut is constructed in this manner, the screwdriver advantageously has a bifurcated engaging portion which has two legs each receivable in one of the slot sections.

A further aspect of the present invention resides in a method of manufacturing spectacles of the type having eyeglass elements and discrete components affixed to the eyeglass elements, which is improved by comprising the steps of forming in the respective eyeglass element a through hole having a cross-sectional enlarged end portion; providing a first thread section on the respective component to be affixed and a compatible second thread section and an actuating section of a diameter at most equal to that of the enlarged end portion of the hole on a connecting member; introducing one of the thread sections into the hole; engaging the thread sections with one another; and turning the connecting member until the actuating section thereof is at least partially accommodated in the enlarged end portion of the hole and the component is affixed to the eyeglass element.

A further development of the method of the present invention which is particularly advantageous for use with a connecting member configured as a nut having a threaded through bore and a transverse slot extending across the bore, and with a threaded stem rigid with the component, is obtained when the turning step includes inserting two legs of a bifurcated end portion of a screwdriver into two sections of the slot which are located at opposite sides of the bore, and rotating the end portion of the screwdriver. It is further to advantage when there is further provided the step of severing that portion of the stem which extends beyond the nut upon tightening of the latter, from the remainder of the stem.

The invention accordingly consists in the features of construction, combination of elements, arrangement of parts and series of steps which will be exemplified in the spectacles and method of manufacturing the same which will be described hereinafter and of which the scope of protection will be indicated in the appended claims.

BRIEF DESCRIPTION OF THE DRAWINGS

In the accompanying drawings in which several of the various possible modifications of the invention are shown:

FIG. 1 is a perspective view of a pair of prescription eyeglasses equipped with ornamentation affixed to the respective lens in accordance with the present invention;

FIG. 2 is an enlarged perspective view of the ornamentation which may be used in the prescription eyeglasses of FIG. 1;

FIG. 3 is a perspective view of an eyeglass element or lens which can be used in the prescription eyeglasses of FIG. 1 and which is provided with a through hole for receiving the ornamentation of FIG. 2;

FIG. 4 is an exploded sectional view taken on line IV—IV of FIG. 1;

FIG. 5 is an end view taken in the direction of the arrow V in FIG. 4 of a screw-type connector;

FIG. 6 is an end view taken in the direction of the arrow VI of FIG. 4 of a nut-type connector;

DETAILED DESCRIPTION OF THE PREFERRED EMBODIMENTS

Figure 7:
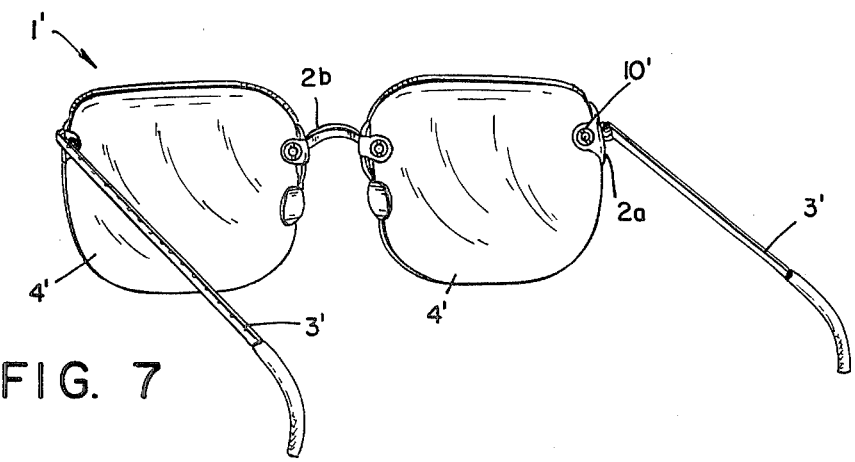
FIG. 7 is a view similar to FIG. 1 but of a pair of sunglasses wherein the connecting arrangement of the present invention is used for connecting the frame to the eyeglass elements.

Referring now to the drawing in detail and first to FIG. 1 thereof, it may be seen therein that the reference numeral 1 has been used to designate a pair of eyeglasses, such as prescription eyeglasses in its entirety. The eyeglasses or spectacles 1 includes a frame 2 to which there are hingedly connected respective temple pieces 3 and which surrounds and supports the respective eyeglass elements 4. As also seen in FIG. 1, an ornamentation 5 can be connected to the respective eyeglass element 4 in a manner which will be discussed presently. The ornamentation 5 is illustrated in detail in FIG. 2, and it may be seen that it includes an ornamentation element 6, as illustrated, a letter M, to which there is attached a gem setting 7 supporting a gem 8. A threaded stem 9 is also connected to the ornamentation element 6 and a connecting member 10 is threadedly connected to the stem 9. While the stem 9 has been shown as being connected to the ornamentation element 6, it will be appreciated that it could also be rigid with the connecting member 10 to constitute a screw therewith which then would be threaded into a threaded bore of the ornamentation element 6. It may be also ascertained from FIG. 2 that the connecting element 10 has a collar-shaped actuating portion 11, and may have a guiding portion 12 the purpose of which will be explained later on.

Turning now to FIG. 3, it may be seen that it illustrates the lens 4 which in this particular instance may be relatively thin. The lens 4 is provided with a through hole 17 which has an enlarged end portion 18. As also diagrammatically illustrated in FIG. 3, the end portion 18 may be enlarged by resorting to the use of a drilling tool 21 which has a stem 22 and a drilling bit 23 rigid with the stem 22. The drilling bit 23 has a centering projection 24 which is accommodated in the through hole 17 during the drilling, and a cutting edge 25 which extends transversely of the axis of the stem 22 and which is capable of removing material from the lens 4 until the enlarged end portion 18 is provided therein.

FIG. 4 illustrates, in an exploded view, the cooperation of the ornamentation element of FIG. 2 with the lens of FIG. 3. As a comparison with FIG. 5 will reveal, the threaded stem 9 has a mounting portion 15 which is integral with the threaded portion and to which the ornamentation element 6 is connected in any conventional way, such as by soldering. Two extensions 19 and 20 may extend radially from the mounting portion 15 at opposite sides thereof.

On the other hand, as may be seen from FIGS. 4 and 6, the connecting member 10 has a threaded bore 14 and a slot 13 which extends across and is interrupted by the threaded bore 14.

It will also be evident from FIG. 4 that, as illustrated therein, the through hole 17 in the lens or eyeglass element 4 has a diameter sufficient to accommodate the guiding portion 12 of the nut 10 so that the nut 10 will be guided in the through hole 17 at least during the terminal phase of the tightening of the nut 10. Of course, if such guidance is not desired, the guiding portion 12 can be omitted and the through hole 17 may be made appropriately smaller, that is, only large enough to let the threaded stem 9 pass therethrough. It may be also seen from FIG. 4, that the eyeglass element 4 may be provided with a recess 16 extending across the bore 17, this recess then receiving the extensions 19 and 20 of the mounting portion 15 of the threaded stem 9, thus holding the mounting portion 15, and hence the ornamentation element 6, in position and particularly preventing the same from turning during the tightening of the connecting member 10. Of course, if so desired, the recess 16 could be omitted and the extensions 19 and 20 could be also omitted. However, if the extensions 19 and 20 are provided, they will improve the frictional retention of the threaded stem 19 in position even in the absence of the recess 16 due to their frictional engagement with the surface of the lens element 4.

A pair of spectacles which has such relatively thin eyeglass elements 4' is illustrated in FIG. 7, the spectacles being illustrated therein being non-prescription sunglasses. As seen in this Figure, the mounting arrangement of the present invention can be used for connecting either hinge components 2a to which the temple or side pieces 3' are hingedly connected, or a nose piece 2b, to the respective eyeglass elements 4'. In this instance, the connecting element 10 will again be accommodated in a recess at the inside of the eyeglass element 4', while the respective hinge component 2a will be connected to the threaded stem 9 in a manner similar to that discussed above.

Figure 9:
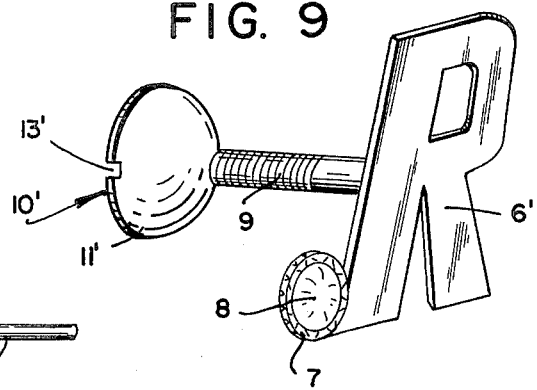
FIG. 9 is a view similar to FIG. 2 but of a different ornamentation suited for use in connection with the eyeglass element of FIG. 8.
Figure 8:
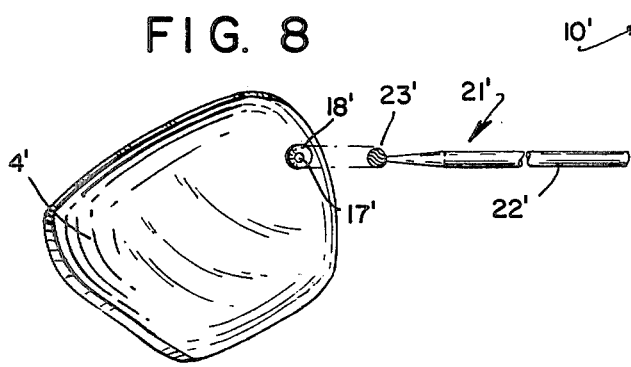
FIG. 8 is a view similar to FIG. 3 but of a thicker eyeglass element provided with a part-spherical enlarged end portion of a through hole.
Figure 10:
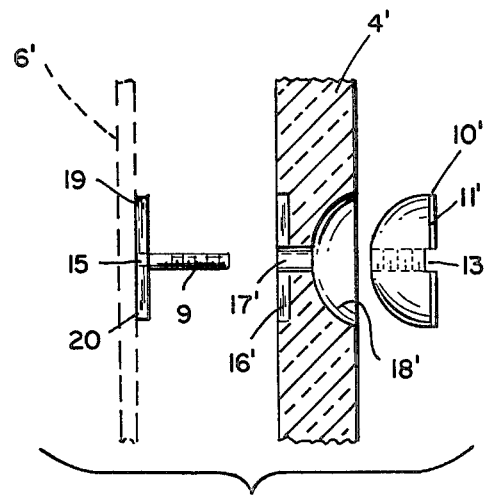
FIG. 10 is a view similar to FIG. 4 but showing the eyeglass element of FIG. 8 and the ornamentation of FIG. 9.

A further modification of the above-discussed concepts which may be used either for affixing the ornamentation 5, regardless of which type of eyeglass frame is being used, or for affixing the frame components 2a or 2b to eyeglass elements 4', is shown in FIGS. 8 to 10. The modifications illustrated in these Figures are of such a character that the same reference numerals, supplemented with primes, have been used to designate those parts of these Figures which are similar in configuration and identical in function to those discussed above. As seen in FIG. 8, the eyeglass element 4' is somewhat thicker, at least in its border regions, than that illustrated in FIG. 3. Hence, it is possible to use a different drilling tool 21' which again has a stem 22' and a substantially spherical drilling bit 23'. As a result of the use of this drilling element, which is much less expensive than the drilling element 21 illustrated in FIG. 3, there is obtained an enlarged portion 18' of a part-spherical configuration, as seen particularly well in FIG. 10.

Figure 11:
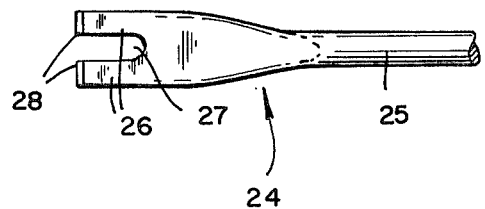
FIG. 11 is a side elevational view of an end portion of a screw driver which may be used in conjunction with the arrangement of the present invention.

FIG. 9 illustrates a different ornamentation 6', which, however, again has the gem setting 7' and a gem 8' supported in the setting 7', and the stem 9. While it would be possible to use the connecting member 10 discussed above, it is further proposed to use a connecting member 10' in this connection, the shape of the connecting member 10' being particularly well seen in FIG. 10. Basically, the connecting member 10' has a part-spherical configuration which conforms to that of the enlarged end portion 18' so that a large-area contact is obtained between the connecting member 10' and the surface bounding the enlarged end portion 19'. FIG. 10 also illustrates that, since the connecting member 10' does not have a guiding portion similar to the guiding portion 12 of the connecting member 10, the hole 17' may have a relatively small diameter, generally speaking, only somewhat larger than the external diameter of the stem 9. In all other respects, the arrangement is the same as discussed above. Having so described the structure of the arrangement of the present invention in its various modifications, the method of manufacturing the spectacles equipped with this arrangement will now be briefly discussed. However, first of all, reference is being had to FIG. 11 which illustrates the end portion of a screwdriver 24 which may be used to advantage in connection with the arrangement of the present invention. The screwdriver 24 has a stem 25 and two legs 26 which are separated from one another by a slot 27 having a transverse dimension at least equal to the diameter of the stem 9 of the ornamentation element 6 or 6' or of the frame component 2a or 2b. Each of the legs 26 of the end portion of the screwdriver 24 has engaging zones 28, which may have tapering configurations, these engaging portions 28 being received in the section of the slot 13 of the connecting member 10 or 10' which are located across the threaded bore 14 from one another. Thus, when the screwdriver 24 is rotated, after the connecting member 10 or 10' has been engaged with the thread of the stem 9, the engagement of the engaging portions 28 in the slot sections of the slot 13 will cause the connecting member 10 or 10' to rotate with the screwdriver 24. During this continued rotation, as the connecting member 10 or 10' approaches the tightened position thereof, the free end of the stem 9 will gradually emerge from the threaded bore 14 at the actuating portion 11 or 11' and into and beyond the slot 13. Since the screwdriver 24 is provided with the slot 27, the free end portion of the stem 9 will penetrate into this slot 27 and thus not interfere with the rotation of the screwdriver 24. Once the connecting member 10 or 10' is fully tightened, the free end portion of the stem 9 which extends beyond the end face of the actuating portion 11 or 11' can be clipped off or otherwise severed from the remainder of the stem 9, and possibly even upset in order to prevent the connecting member 10 or 10' from loosening.

It will be appreciated that the arrangement discussed above is very advantageous, particularly in view of the fact that the connecting member 10 or 10' is at least partially, but preferably fully accommodated in the enlarged end portion 18 or 18' of the through hole 17 or 17', so that it will not present a danger of injury to the face or especially to the eyes of the user of the eyeglasses in the event of an accident or the like. It thus will be seen that there is provided an arrangement and method which achieve the various objects of the invention and which are well adapted to meet the conditions of practical use.

As various possible embodiments may be made of the above invention, and as various changes may be made in the embodiments set forth above, it is to be understood that all matter herein described or shown in the accompanying drawing is to be interpreted as illustrative only and not in a limiting sense. Thus, it will be understood by those skilled in the art that, although preferred and alternative embodiments have been shown and described, the invention is not limited thereto or thereby. Rather, the scope of the present invention will be determined solely with reference to the accompanying claims.

I claim:

1. Spectacles comprising, in combination, at least one eyeglass element; at least one discrete component; and means for affixing said component to said eyeglass element, including a circular through hole in said eyeglass element having a cross-sectionally enlarged end portion at the inner side of said eyeglass element, and cooperating means on said component and the outer surface of said eyeglass element for orienting said component with respect to the axis of said through hole; a connecting member, a first thread section on said component and a compatible second thread section of said connecting member, one of said thread sections being received in said hole and threadedly engaging the other thread section, and an actuating section on said connecting member operative for turning said connecting member upon actuation and having a cross-sectional diameter at most equal to that of said end portion of said hole to be at least partially received in the latter upon tightening of said connecting member.

2. Spectacles as defined in claim 1, wherein said component has an externally threaded stem rigid therewith and constituting said one thread section; and wherein said connecting member is a nut having an internal thread constituting said other thread section and threaded onto said externally threaded stem.

3. Spectacles as defined in claim 2, wherein said nut has a central bore therein having said internal thread over substantially the entire length thereof and being open at both of its ends; and wherein said actuating section of said nut has a transverse slot at one end thereof extending across, and having two slot sections each to one side of one of said ends of said bore, each of said slot sections being adapted to receive one leg of a bifurcated end portion of a screwdriver.

4. Spectacles as defined in claim 1, wherein said end portion of said hole has such a depth that said actuating section of said connecting member is fully accommodated therein upon said tightening.

5. Spectacles as defined in claim 1, wherein said enlarged portion of the through hole is so configurated as to form an abutment shoulder between said end portion and the remainder of said hole; and wherein said actuating section of said connecting member has a contact surface contacting said abutment shoulder upon tightening.

6. Spectacles as defined in claim 5, wherein said abutment shoulder and contact surface have mating, spherically curved contours coaxial with said through hole.

7. Spectacles as defined in claim 5, wherein said abutment shoulder and contact surface are flat and perpendicular to the axis of said through hole.

8. Spectacles as defined in claim 1, wherein said component is a nosepiece of the spectacles.

9. Spectacles as defined in claim 1, wherein said component is a hinge component of a temple piece of the spectacles.

10. Spectacles as defined in claim 1, wherein said component is an ornamental piece visibly arranged on said eyeglass element.

11. Spectacles as defined in claim 1, wherein said cooperating means comprises a non-circular recess in said eyeglass element at, and extending transversely from, the other end portion of said hole, and a projection on said component substantially fittingly received in said recess.

* * * * *